United States Patent
Lopes et al.

(10) Patent No.: US 10,034,190 B2
(45) Date of Patent: Jul. 24, 2018

(54) ENHANCING NETWORK OPERATION WITH UE CONTEXT AWARENESS

(71) Applicant: QUALCOMM Incorporated, San Diego, CA (US)

(72) Inventors: Luis Fernando Brisson Lopes, Swindon (GB); Gavin Bernard Horn, La Jolla, CA (US); Osok Song, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/865,941

(22) Filed: Sep. 25, 2015

(65) Prior Publication Data

US 2016/0242059 A1   Aug. 18, 2016

Related U.S. Application Data

(60) Provisional application No. 62/115,532, filed on Feb. 12, 2015.

(51) Int. Cl.
*H04W 4/00* (2018.01)
*H04W 24/00* (2009.01)
(Continued)

(52) U.S. Cl.
CPC .......... *H04W 24/10* (2013.01); *H04W 24/02* (2013.01); *H04W 24/08* (2013.01)

(58) Field of Classification Search
None
See application file for complete search history.

(56) References Cited

U.S. PATENT DOCUMENTS 8,873,513 B2    10/2014 Chaponniere et al.
2004/0180701 A1   9/2004 Livet et al.
(Continued)

FOREIGN PATENT DOCUMENTS

WO   WO-2005025260 A1   3/2005
WO   WO-2008087535 A2   7/2008
(Continued)

OTHER PUBLICATIONS

International Search Report and Written Opinion—PCT/US2016/016611—ISA/EPO—dated May 10, 2016.
(Continued)

*Primary Examiner* — Erika Washington
(74) *Attorney, Agent, or Firm* — Norton Rose Fulbright US LLP

(57) ABSTRACT

Enhanced network operation is described in which UE context awareness reports requested in network management. A set of conditions is provided to the UE by a serving base station that triggers the UE to transmit a status report to the serving base station. The set of conditions includes at least one non-cellular UE condition. The UE monitors for the conditions and then, when detected, obtains reporting information for the status report that includes one or both of non-cellular and cellular UE information. The UE transmits the status report with the reporting information to the serving base station which uses the information to make determinations regarding network operations management. The serving base station may manage such network operations by sending updated or modified configuration data to the UE or by sending instructions to other network entities to prepare resources for predicted future UE communications.

57 Claims, 6 Drawing Sheets

(51) Int. Cl.
*H04W 24/10* (2009.01)
*H04W 24/02* (2009.01)
*H04W 24/08* (2009.01)

(56) References Cited

U.S. PATENT DOCUMENTS

| | | | |
|---|---|---|---|
| 2008/0207195 A1* | 8/2008 | Ranta | H04W 24/10 455/423 |
| 2012/0170478 A1* | 7/2012 | Doettling | H04W 52/0264 370/252 |
| 2014/0187235 A1 | 7/2014 | Cai et al. | |
| 2014/0321448 A1 | 10/2014 | Backholm et al. | |
| 2015/0016412 A1* | 1/2015 | Horn | H04W 36/24 370/331 |
| 2015/0055463 A1 | 2/2015 | Alisawi et al. | |

FOREIGN PATENT DOCUMENTS

| WO | WO-2011018104 A1 | 2/2011 |
|---|---|---|
| WO | WO-2011109375 A1 | 9/2011 |

OTHER PUBLICATIONS

Qualcomm Europe: "On Device Management Aspects of Minimisation of Drive Tests and Son", 3GPP Draft, S5-093139—On Device Management Aspects of MDT and Son, 3rd Generation Partnership Protect (3GPP), Mobile Competence Centre, 650, Route Des Lucioles, F-06921 Sophia-Antipolis Cedex, France, vol. SA WG5, no. Dublin, Ireland; Jun. 29, 2009-Jul. 3, 2009, Jul. 2, 2009 (Jul. 2, 2009) [retrieved on Jul. 2, 2009] paragraph [2.1.1]-paragraph [2.1.2].

* cited by examiner

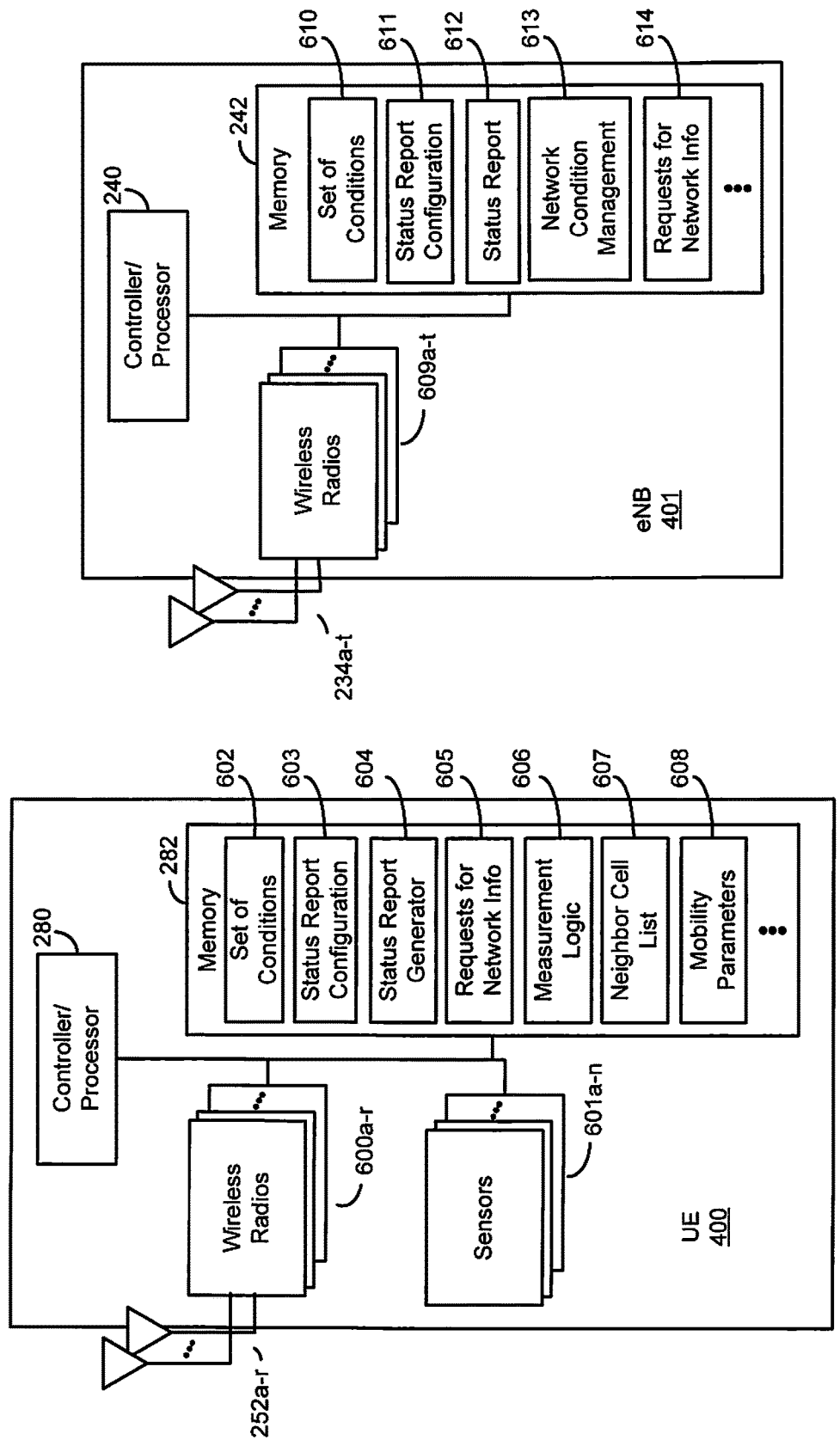

ENHANCING NETWORK OPERATION WITH UE CONTEXT AWARENESS

CROSS-REFERENCE TO RELATED APPLICATIONS

This application claims the benefit of U.S. Provisional Patent Application No. 62/115,532, entitled, "ENHANCING NETWORK OPERATION WITH UE CONTEXT AWARENESS," filed on Feb. 12, 2015, which is expressly incorporated by reference herein in its entirety.

BACKGROUND

Field

Aspects of the present disclosure relate generally to wireless communication systems, and more particularly, to enhancing network operation with user equipment (UE) context awareness information.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In one aspect of the disclosure, a method of wireless communication, includes receiving, at a UE, a set of conditions that trigger the UE to transmit a status report to a serving base station, wherein the set of conditions includes at least one non-cellular UE condition, detecting, by the UE, one or more of the set of conditions, obtaining, by the UE, reporting information for the status report, wherein the reporting information includes one or more of: non-cellular UE information and cellular UE information, and transmitting, by the UE, the status report to the serving base station. The method further includes receiving, at the UE, one or more information requests from the serving base station for network management information and transmitting, by the UE, a measurement report including the network management information obtained in response to the one or more information requests.

In an additional aspect of the disclosure, a method of wireless communication, includes transmitting, by a base station, a set of conditions that trigger a UE to transmit a status report to the base station, wherein the set of conditions includes at least one non-cellular UE condition, receiving, by the base station, the status report from the UE, wherein the status report includes one or more of: non-cellular UE information and cellular UE information, and determining, by the base station, whether to select the UE for one or more network management tasks for network condition management based on the status report.

In an additional aspect of the disclosure, an apparatus configured for wireless communication, includes means for receiving, at a UE, a set of conditions that trigger the UE to transmit a status report to a serving base station, wherein the set of conditions includes at least one non-cellular UE condition, means for detecting, by the UE, one or more of the set of conditions, means for obtaining, by the UE, reporting information for the status report, wherein the reporting information includes one or more of non-cellular UE information and cellular UE information, and means for transmitting, by the UE, the status report to the serving base station. The apparatus further includes means for receiving, at the UE, one or more information requests from the serving base station for network management information and means for transmitting, by the UE, a measurement report including the network management information obtained in response to the one or more information requests.

In an additional aspect of the disclosure, an apparatus configured for wireless communication, includes means for transmitting, by a base station, a set of conditions that trigger a UE to transmit a status report to the base station, wherein the set of conditions includes at least one non-cellular UE condition, means for receiving, by the base station, the status report from the UE, wherein the status report includes one or more of: non-cellular UE information and cellular UE information, and means for determining, by the base station, whether to select the UE for one or more network management tasks for network condition management based on the status report.

In an additional aspect of the disclosure, a non-transitory computer readable medium includes program code recorded thereon. The program code includes code to receive, at a UE, a set of conditions that trigger the UE to transmit a status report to a serving base station, wherein the set of conditions includes at least one non-cellular UE condition, code to detect, by the UE, one or more of the set of conditions, code to obtain, by the UE, reporting information for the status report, wherein the reporting information includes one or more of: non-cellular UE information and cellular UE information, and code to transmit, by the UE, the status report to the serving base station. The program code further includes code to receive, at the UE, one or more information requests from the serving base station for network management information and code to transmit, by the UE, a measurement report including the network management information obtained in response to the one or more information requests.

In an additional aspect of the disclosure, a non-transitory computer readable medium includes program code recorded thereon. The program code includes code to transmit, by a base station, a set of conditions that trigger a UE to transmit a status report to the base station, wherein the set of conditions includes at least one non-cellular UE condition, code to receive, by the base station, the status report from the UE, wherein the status report includes one or more of: non-cellular UE information and cellular UE information, and code to determine, by the base station, whether to select the UE for one or more network management tasks for network condition management based on the status report.

In an additional aspect of the disclosure, an apparatus configured for wireless communication includes at least one processor and a memory coupled to the processor. The at least one processor is configured to receive, at a UE, a set of conditions that trigger the UE to transmit a status report to a serving base station, wherein the set of conditions includes at least one non-cellular UE condition, to detect, by the UE, one or more of the set of conditions, to obtain, by the UE, reporting information for the status report, wherein the reporting information includes one or more of: non-cellular UE information and cellular UE information, and to transmit, by the UE, the status report to the serving base station. The apparatus further includes configuration of the processor to receive, at the UE, one or more information requests from the serving base station for network management information and to transmit, by the UE, a measurement report including the network management information obtained in response to the one or more information requests.

In an additional aspect of the disclosure, an apparatus configured for wireless communication includes at least one processor and a memory coupled to the processor. The at least one processor is configured to transmit, by a base station, a set of conditions that trigger a UE to transmit a status report to the base station, wherein the set of conditions includes at least one non-cellular UE condition, to receive, by the base station, the status report from the UE, wherein the status report includes one or more of: non-cellular UE information and cellular UE information, and to determine, by the base station, whether to select the UE for one or more network management tasks for network condition management based on the status report.

BRIEF DESCRIPTION OF THE DRAWINGS

FIG. 6A is a block diagram illustrating a UE configured according to one aspect of the present disclosure.

FIG. 6B is a block diagram illustrating an eNB configured according to one aspect of the present disclosure.

DETAILED DESCRIPTION

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The techniques described herein may be used for various wireless communication networks such as CDMA, TDMA, FDMA, OFDMA, SC-FDMA and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LIE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

Figure 1:
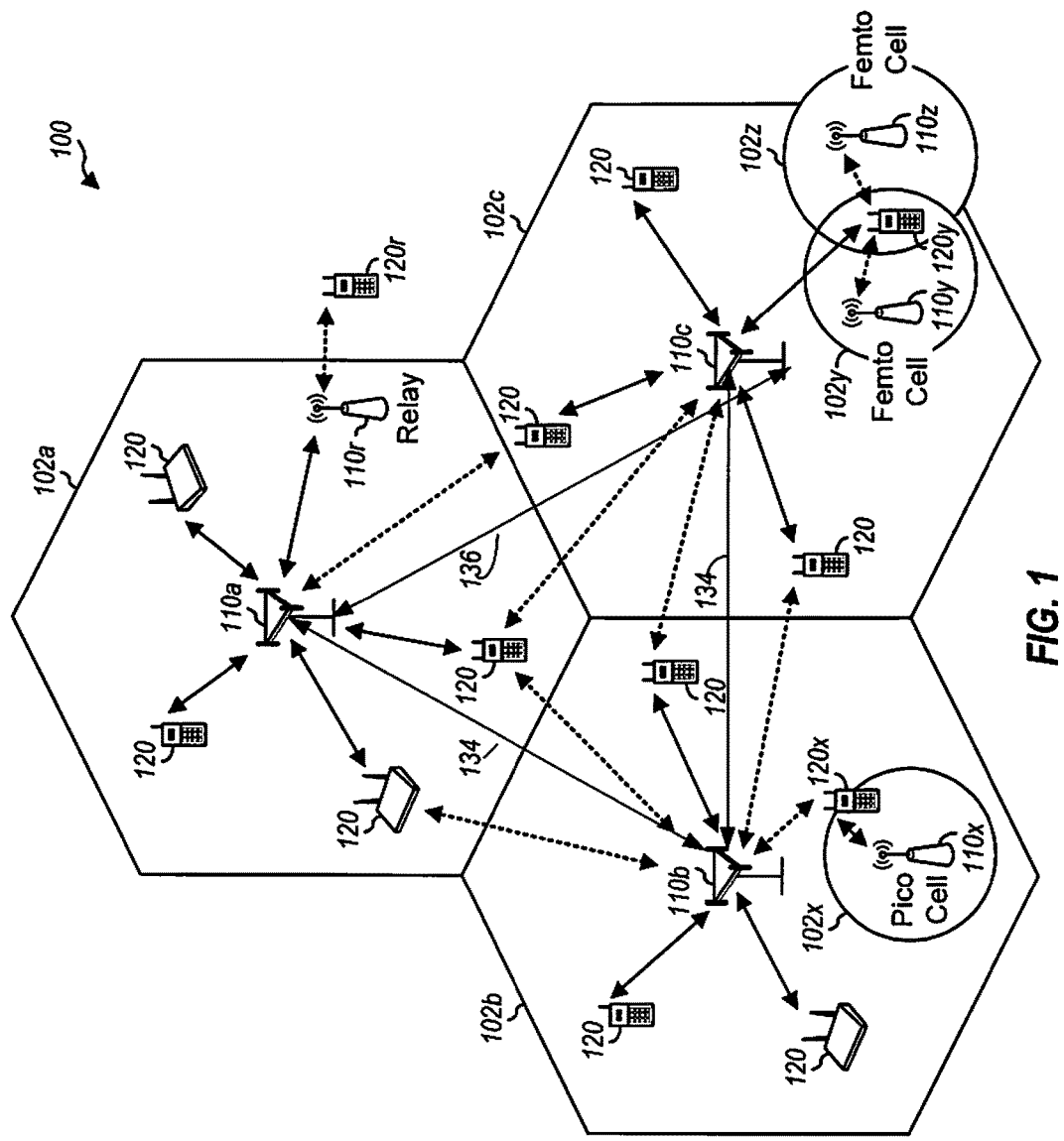
FIG. 1 is a block diagram illustrating an example of a mobile communication system.

FIG. 1 shows a wireless network 100 for communication, which may be an LTE-A network. The wireless network 100 includes a number of evolved node Bs (eNBs) 110 and other network entities. An eNB may be a station that communicates with the UEs and may also be referred to as a base station, a node B, an access point, and the like. Each eNB 110 may provide communication coverage for a particular geographic area. In 3GPP, the term "cell" can refer to this particular geographic coverage area of an eNB and/or an eNB subsystem serving the coverage area, depending on the context in which the term is used.

An eNB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. In the example shown in FIG. 1, the eNBs 110a, 110b and 110c are macro eNBs for the macro cells 102a, 102b and 102c, respectively. The eNB 110x is a pico eNB for a pico cell 102x. And, the eNBs 110y and 110z are femto eNBs for the femto cells 102y and 102z, respectively. An eNB may support one or multiple (e.g., two, three, four, and the like) cells.

The wireless network 100 also includes relay stations. A relay station is a station that receives a transmission of data and/or other information from an upstream station (e.g., an eNB, a UE, or the like) and sends a transmission of the data and/or other information to a downstream station (e.g., another UE, another eNB, or the like). A relay station may also be a UE that relays transmissions for other UEs. In the example shown in FIG. 1, a relay station 110r may communicate with the eNB 110a and a UE 120r, in which the relay station 110r acts as a relay between the two network elements (the eNB 110a and the UE 120r) in order to facilitate communication between them. A relay station may also be referred to as a relay eNB, a relay, and the like.

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time.

The UEs 120 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE/-A utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 72, 180, 300, 600, 900, and 1200 for a corresponding system bandwidth of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.4, 3, 5, 10, 15, or 20 MHz, respectively.

The wireless network 100 uses the diverse set of eNBs 110 (i.e., macro eNBs, pico eNBs, femto eNBs, and relays) to improve the spectral efficiency of the system per unit area. Because the wireless network 100 uses such different eNBs for its spectral coverage, it may also be referred to as a heterogeneous network. The macro eNBs 110a-c are usually carefully planned and placed by the provider of the wireless network 100. The macro eNBs 110a-c generally transmit at high power levels (e.g., 5 W-40 W). The pico eNB 110x and the relay station 110r, which generally transmit at substantially lower power levels (e.g., 100 mW-2 W), may be deployed in a relatively unplanned manner to eliminate coverage holes in the coverage area provided by the macro eNBs 110a-c and improve capacity in the hot spots. The femto eNBs 110y-z, which are typically deployed independently from the wireless network 100 may, nonetheless, be incorporated into the coverage area of the wireless network 100 either as a potential access point to the wireless network 100, if authorized by their administrator(s), or at least as an active and aware eNB that may communicate with the other eNBs 110 of the wireless network 100 to perform resource coordination and coordination of interference management. The femto eNBs 110y-z typically also transmit at substantially lower power levels (e.g., 100 mW-2 W) than the macro eNBs 110a-c.

In operation of a heterogeneous network, such as the wireless network 100, each UE is usually served by the eNB 110 with the better signal quality, while the unwanted signals received from the other eNBs 110 are treated as interference. While such operational principals can lead to significantly sub-optimal performance, gains in network performance are realized in the wireless network 100 by using intelligent resource coordination among the eNBs 110, better server selection strategies, and more advanced techniques for efficient interference management.

A pico eNB, such as the pico eNB 110x, is characterized by a substantially lower transmit power when compared with a macro eNB, such as the macro eNBs 110a-c. A pico eNB will also usually be placed around a network, such as the wireless network 100, in an ad hoc manner. Because of this unplanned deployment, wireless networks with pico eNB placements, such as the wireless network 100, can be expected to have large areas with low signal to interference conditions, which can make for a more challenging RF environment for control channel transmissions to UEs on the edge of a coverage area or cell (a "cell-edge" UE). Moreover, the potentially large disparity (e.g., approximately 20 dB) between the transmit power levels of the macro eNBs 110a-c and the pico eNB 110x implies that, in a mixed deployment, the downlink coverage area of the pico eNB 110x will be much smaller than that of the macro eNBs 110a-c.

In the uplink case, however, the signal strength of the uplink signal is governed by the UE, and, thus, will be similar when received by any type of the eNBs 110. With the uplink coverage areas for the eNBs 110 being roughly the same or similar, uplink handoff boundaries will be determined based on channel gains. This can lead to a mismatch between downlink handover boundaries and uplink handover boundaries. Without additional network accommodations, the mismatch would make the server selection or the association of UE to eNB more difficult in the wireless network 100 than in a macro eNB-only homogeneous network, where the downlink and uplink handover boundaries are more closely matched.

If server selection is based predominantly on downlink received signal strength, the usefulness of mixed eNB deployment of heterogeneous networks, such as the wireless network 100, will be greatly diminished. This is because the larger coverage area of the higher powered macro eNBs, such as the macro eNBs 110a-c, limits the benefits of splitting the cell coverage with the pico eNBs, such as the pico eNB 110x, because, the higher downlink received signal strength of the macro eNBs 110a-c will attract all of the available UEs, while the pico eNB 110x may not be serving any UE because of its much weaker downlink transmission power. Moreover, the macro eNBs 110a-c will likely not have sufficient resources to efficiently serve those UEs. Therefore, the wireless network 100 will attempt to actively balance the load between the macro eNBs 110a-c and the pico eNB 110x by expanding the coverage area of the pico eNB 110x. This concept is referred to as cell range extension (CRE).

The wireless network 100 achieves CRE by changing the manner in which server selection is determined. Instead of basing server selection on downlink received signal strength, selection is based more on the quality of the downlink signal. In one such quality-based determination, server selection may be based on determining the eNB that offers the minimum path loss to the UE. Additionally, the wireless network 100 provides a fixed partitioning of resources between the macro eNBs 110a-c and the pico eNB 110x. However, even with this active balancing of load, downlink interference from the macro eNBs 110a-c should be mitigated for the UEs served by the pico eNBs, such as the pico eNB 110x. This can be accomplished by various methods, including interference cancellation at the UE, resource coordination among the eNBs 110, or the like.

In a heterogeneous network with cell range extension, such as the wireless network 100, in order for UEs to obtain service from the lower-powered eNBs, such as the pico eNB 110x, in the presence of the stronger downlink signals transmitted from the higher-powered eNBs, such as the macro eNBs 110a-c, the pico eNB 110x engages in control channel and data channel interference coordination with the dominant interfering ones of the macro eNBs 110a-c. Many different techniques for interference coordination may be employed to manage interference. For example, inter-cell interference coordination (ICIC) may be used to reduce interference from cells in co-channel deployment. One ICIC mechanism is adaptive resource partitioning. Adaptive resource partitioning assigns subframes to certain eNBs. In subframes assigned to a first eNB, neighbor eNBs do not transmit. Thus, interference experienced by a UE served by the first eNB is reduced. Subframe assignment may be performed on both the uplink and downlink channels.

For example, Almost Blank Subframe (ABS) subframes may be allocated among a cluster of eNBs. By assigning ABS subframes to certain eNBs, other eNB transmission are protected. For example, for a given subframe, if eNB A is assigned ABS subframes, eNB B may transmit a signal that is effectively protected from or limited in interference from eNB A. For example, a prohibited subframe of the first eNB may correspond to a protected subframe of a second interfering eNB. Thus, the first eNB is the only eNB transmitting data during the first eNB's protected subframe. Common subframes may be used for data transmission by multiple eNBs. Common subframes may also be referred to as "unclean" subframes because of the possibility of interference from other eNBs.

Heterogeneous networks may have eNBs of different power classes. For example, three power classes may be defined, in decreasing power class, as macro eNBs, pico eNBs, and femto eNBs. When macro eNBs, pico eNBs, and femto eNBs are in a co-channel deployment, the power spectral density (PSD) of the macro eNB (aggressor eNB) may be larger than the PSD of the pico eNB and the femto eNB (victim eNBs) creating large amounts of interference with the pico eNB and the femto eNB. Protected subframes may be used to reduce or minimize interference with the pico eNBs and femto eNBs. That is, a protected subframe may be scheduled for the victim eNB to correspond with a prohibited subframe on the aggressor eNB.

Figure 2:
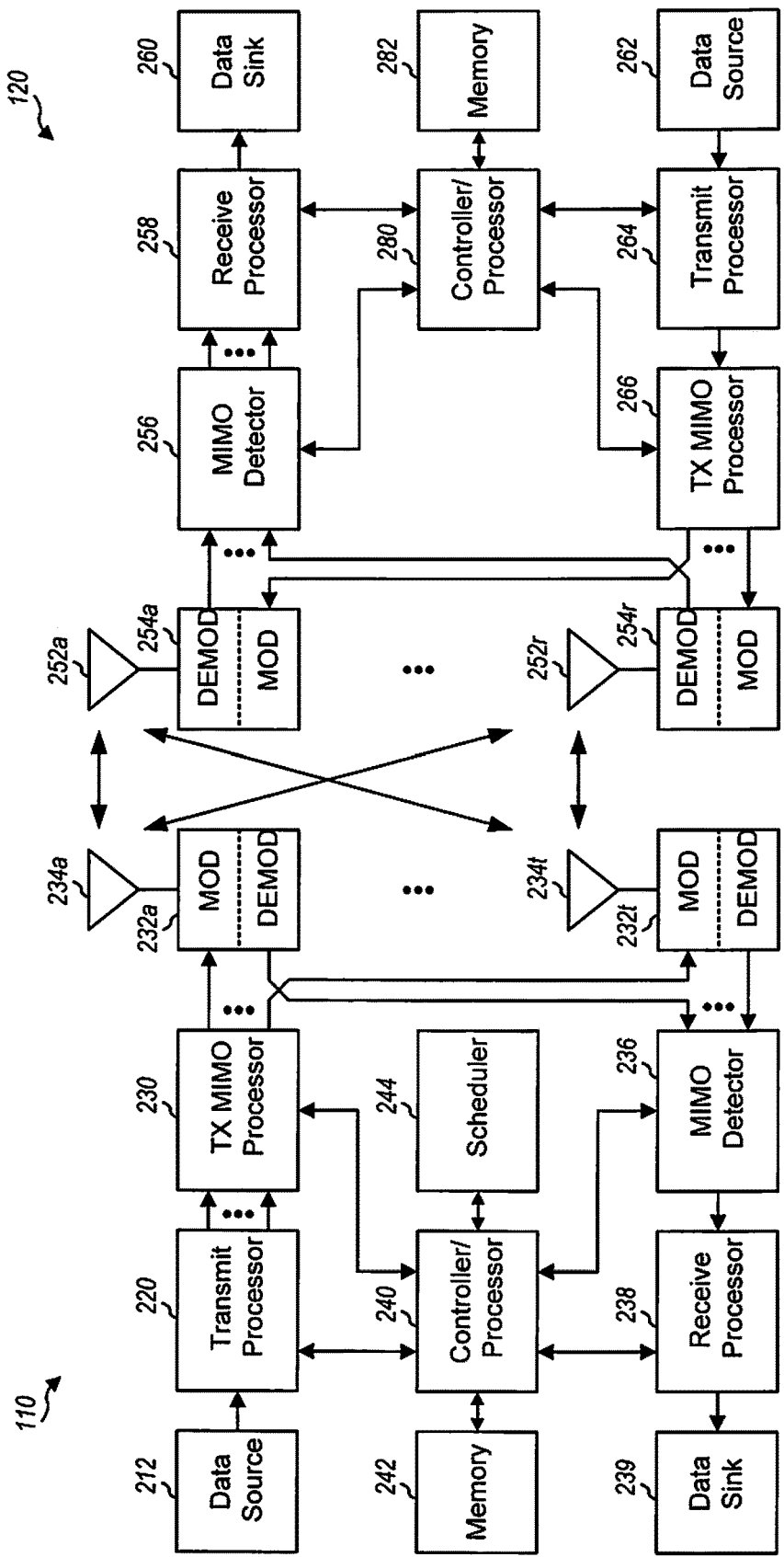
FIG. 2 is a block diagram illustrating a design of a base station/eNB and a UE configured according to one aspect of the present disclosure.

FIG. 2 shows a block diagram of a design of a base station/eNB 110 and a UE 120, which may be one of the base stations/eNBs and one of the UEs in FIG. 1. For a restricted association scenario, the eNB 110 may be the macro eNB 110c in FIG. 1, and the UE 120 may be the UE 120y. The eNB 110 may also be a base station of some other type. The eNB 110 may be equipped with antennas 234a through 234t, and the UE 120 may be equipped with antennas 252a through 252r.

At the eNB 110, a transmit processor 220 may receive data from a data source 212 and control information from a controller/processor 240. The control information may be for the PBCH, PCFICH, PHICH, PDCCH, etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 120, the antennas 252a through 252r may receive the downlink signals from the eNB 110 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the uplink, at the UE 120, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the eNB 110. At the eNB 110, the uplink signals from the UE 120 may be received by the antennas 234, processed by the demodulators 232, detected by a MIMO detector 236 if applicable, and further processed by a receive processor 238 to obtain decoded data and control information sent by the UE 120. The processor 238 may provide the decoded data to a data sink 239 and the decoded control information to the controller/processor 240.

The controllers/processors 240 and 280 may direct the operation at the eNB 110 and the UE 120, respectively. The controller/processor 240 and/or other processors and modules at the eNB 110 may perform or direct the execution of various processes for the techniques described herein. The controllers/processor 280 and/or other processors and modules at the UE 120 may also perform or direct the execution of the functional blocks illustrated in FIGS. 3A and 3B, and/or other processes for the techniques described herein. The memories 242 and 282 may store data and program codes for the eNB 110 and the UE 120, respectively. A scheduler 244 may schedule UEs for data transmission on the downlink and/or uplink.

Wireless network operators are considering new ways to optimize network resources and improve user experience. Context awareness may provide the additional tools to achieve these goals. Context awareness may be considered to include any parameter that describes either the use that is being made of the UE, or the UE's environment, or any other "non-cellular" information. For purposes of this application, "non-cellular" UE information refers to the data or information that may not be accessible by the wireless network or that is either not currently accessible or known, or only roughly known, to the network. Non-cellular UE information may include various pieces of information that are detected or obtained using various sensors on the UE. For example, non-cellular UE information may include battery level threshold, battery charge rate of change, alerting mode of UE, location of UE, predicted location of UE based on either or both of UE mobility or UE calendar information, level of user interaction with UE during a predetermined time window, predicted level of user interaction with UE based on status information locally accessible by the UE, proximity to human identified as main user of UE, and the like. Examples of status information that may be locally accessible to the UE include calendar information, alarm information, application data from an application running on the UE, sensor information from one or more non-cellular sensors of the UE, information received by the UE from another electronic device associated with the main user, and the like.

This definition of non-cellular UE information excludes radio access technology oriented aspects, particularly if known to the network, such as anything that is coved by UE capabilities, RAT capability and availability, network load, measured or estimated system or channel information, and the like. For purposes of this application, such radio access technology oriented information will be referred to as "cellular UE information." While different from the context-oriented information of non-cellular UE information, enhanced UE handling may be achieved in specific cases if some pieces of the cellular UE information are taken into account along with the context-oriented or non-cellular UE information.

The context awareness or non-cellular UE information may be obtained or determined by a UE through use of UE sensors including, but not limited to, gyroscope, accelerometer, GPS, (e.g., to distinguish whether the UE is in a vehicle, such as a train, automobile, motorbike, etc., stationary, or mobile pedestrian). In addition, the UE may use other information from applications running on the UE, such as calendar information, time of day, and the like (e.g., to indicate to the network how long the mobility context is expected to continue). If this non-cellular UE information is converted into parameters or profiles, it may then be possible for the network (e.g., RAN or CN) to take appropriate action or manage network operations, such as by offloading the UE traffic, for example, whether or not to perform selected IP traffic offload (SIPTO) at the local network when the UE is stationary, or in a vehicle, pedestrian, etc.; handover preference, for example, whether to keep the UE on the macro layer or handover the UE to the small cell layer; load balancing and multi-flow activation, for example, whether to enable offloading traffic to small cells while maintaining a connection to the macro cell, or just to keep a connection at the macro cell; paging and registration management, for example, how large an area in which to page the UE, how often to require the UE to register, etc.; discontinuous reception (DRx) parameter management based on the latency the UE can tolerate; and the like.

Additionally, the network may use the UE to collect network management information that may, in turn, be used to improve the quality of service provided to other UEs. For example, based on reported non-cellular conditions, the network may determine that the UE should be selected to execute certain measurements that may be used to diagnose reported network problems, such as high interference, gaps in coverage areas, overloaded access points, and the like.

Various aspects of the present disclosure may provide for a set of conditions including at least one non-cellular UE condition that triggers a UE to send a status report to a serving base station. The status report can include any combination of cellular and non-cellular UE information that the base station may use to determine management of network operations.

Figure 3:
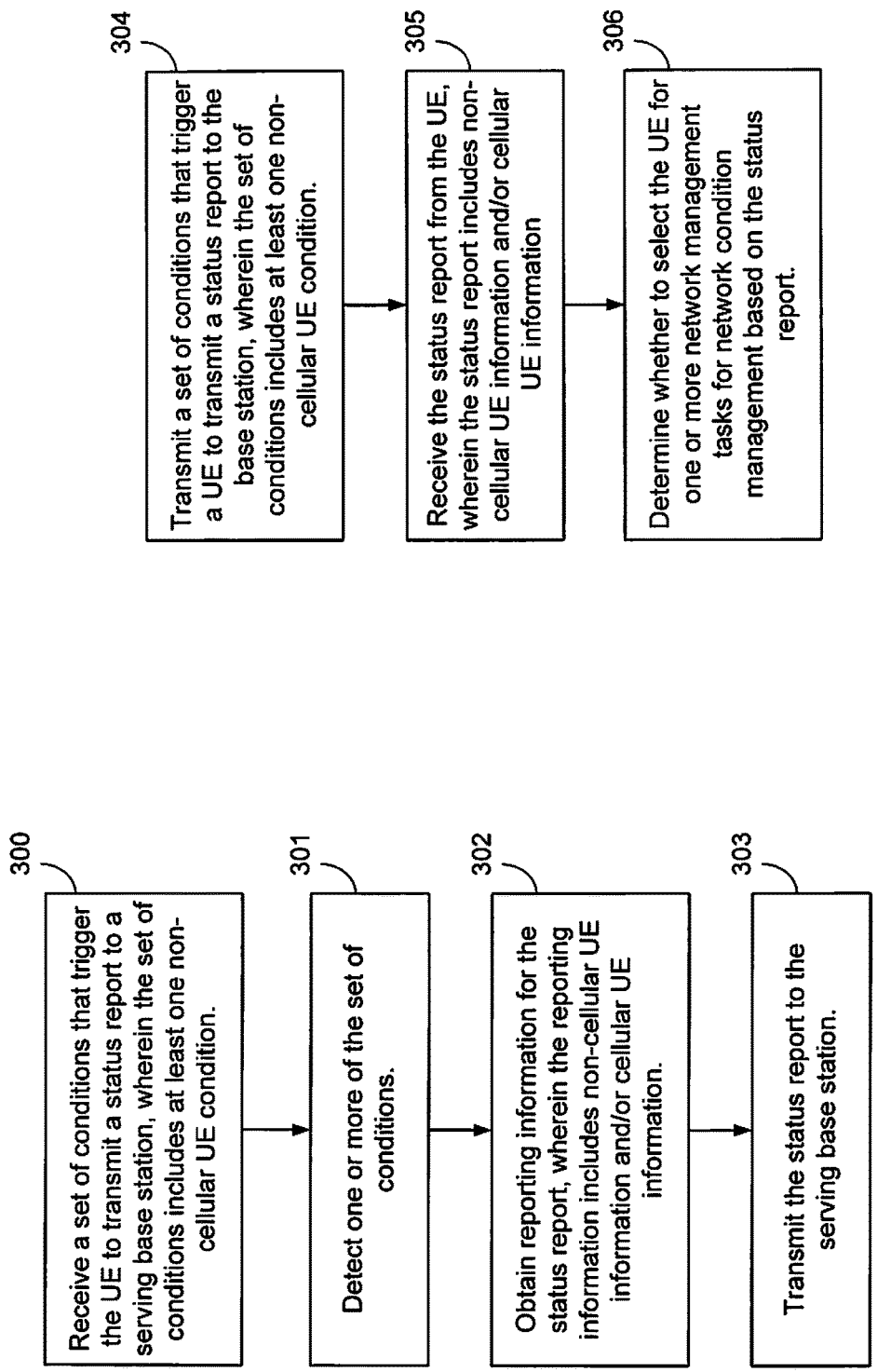
FIGS. 3A and 3B are block diagrams illustrating example blocks executed to implement aspects of the present disclosure.

FIGS. 3A and 3B are block diagrams illustrating example blocks executed to implement aspects of the present disclosure. The blocks illustrated with regard to FIG. 3A represent blocks implemented at a UE configured according to one aspect of the present disclosure, while the blocks illustrated with regard to FIG. 3B represent blocks implemented at a base station configured according to one aspect of the present disclosure. The UE and base station of FIGS. 3A and 3B may, for example, include the features and components described and illustrated with regard to base station 110 and UE 120 in FIG. 2. At block 304, an eNB transmits a set of conditions that trigger a UE to transmit a status report to the base station, wherein the set of conditions includes at least one non-cellular UE condition. At block 300, the UE receives the set of conditions from the serving base station that triggers the UE to transmit a status report to the serving base station. The UE will then monitor for these conditions, including the non-cellular UE conditions.

At block 301, the UE may detect one or more of the set of conditions. For example, if one of the non-cellular conditions includes a user coming into proximity with the UE, when detected, the UE triggers the status report process. At block 302, the UE obtains reporting information for the status report, in which the reporting information includes one or both of non-cellular UE information and cellular UE information. For example, the triggering condition may be proximity of a user to the UE. This condition may be detected through various mechanisms. For instance, the UE may be in wireless communication with a different device, such as a personal wireless device, including a fitness monitor, which signals the UE detects when the user is wearing such device. When the condition of the user being in proximity is detected, the condition triggers the reporting mechanism. The UE gathers all of the information that is to be placed into the report including either or both of cellular UE information and non-cellular UE information. For example, while the trigger condition is user proximity to the UE, the information gathered for the report may include additional cellular and non-cellular UE information, such as whether the UE is indoors, in a vehicle, in a building, the battery level, current signal quality, and signal quality of neighboring base stations or access points, and the like. Various different types of cellular and non-cellular information and combinations thereof may make up the information gathered for the status report. At block 303, the UE transmits this status report to the serving base station.

Back at the serving base station, at block 305, the serving base station receives the status report from the UE, wherein the status report includes either or both of the non-cellular UE information and cellular UE information. The serving base station may then analyze system operations based, at least in part, on the non-cellular UE information. The serving base station may also use any cellular UE information included in the report for such system operations analysis. At block 306, the base station determines, based on the analysis of the status report whether the UE is a candidate for selection to perform one or more network management tasks for network condition management. A network management task may include any of a variety of tasks in which the UE may obtain network management information. Depending on the information in the status report, the UE may or may not be experiencing conditions or in a state that would suggest performance by the base station of network condition management.

In one example aspect, if the base station were to determine that the UE is a candidate for network management tasks, the base station may transmit one or more requests for network management information to the UE. The requests for network management information may include such requests for the UE to measure radio conditions experienced by the UE, to identify and measure power in signals received from one or more neighboring base stations, to decode signals intercepted from one or more proximate access points not in a current neighbor cell list, to determine interference conditions from one or more network entities, to measure channel conditions in one or more different frequencies, one or more different bands, or one or more different radio access technologies, and the like. The requests may trigger the UE to measure and/or decode access point identifiers (IDs), including other RATs, WLANs, and the like, and measuring their signal strength or carrier-to-interference ratio, broadcast information, quality of service, and the like. In some examples, the requests may also instruct the UE to attempt a dummy data call, in order to test a particular data network or connection, join a multimedia broadcast multicast service (MBMS), or the like, to report on the results of the attempted connection. The base station would then manage network conditions based, at least in part, on the network management information received from the UE.

It should be noted that, in various aspects of the present disclosure, the requests for network management information may be transmitted either in response to the serving base station determining that a UE should be selected for network management tasks based on the status report or along with the set of conditions for triggering the UE status reporting from blocks 304/300, in which case the base station may transmit a triggering signal that may trigger the UE to perform the requested network management tasks. The additional network management tasks included in the requests may be variable and, perhaps, depend on the specifics of the status report, the actual location of the UE, the UE's capabilities, and the like.

Additionally, the configuration of the status report may also be transmitted with this initial information at blocks 304/300. For example, the configuration of the status report may detail which cellular and non-cellular UE information to include in the report, the periodicity to send the report once the condition is triggered, and the like. Thus, the UE may detect the conditions in the set of conditions and compile both network management information and the condition information and, because of it has received also a configuration for the status report, the UE may arrange all of the requested information into the status report.

It should further be noted that the base station may take actions to manage the network conditions based only on the information contained in the status report. In such additional aspects, the base station would use the non-cellular UE information in the status report in addition to any other cellular UE information either from the status report or other regular measurement reports from the UE in order to manage the network conditions.

Multiple examples of different categories of non-cellular UE information exist that may be used for generating a status report according to various aspect of the present disclosure in conjunction with the blocks illustrated and described with respect to FIGS. 3A and 3B. Such various categories and combinations of categories of non-cellular UE information may be employed in interactions between UEs and eNBs configured according to various aspects of the disclosure. For example, location and mobility context may be used as non-cellular UE information in a status report for the eNBs configured according to aspects of the present disclosure to predict future location or movement of a UE. Location relates to actual user interest and activity, e.g., is the user at a work location, where he/she would typically have a certain usage pattern, while mobility context captures aspects such as whether the user is stationary, in car or train, "walking on the spot", etc. Such non-cellular UE information, possibly combined with other cellular UE information, may be used to predict the user's future location, or the user's likely movement.

In such location and mobility contexts, the network may be able to derive some of these characteristics at a high level through tracking area updates (TAUs) in idle mode, and through handovers (UE History) in connected mode. In more advanced systems, information may be provided to the network upon (or after) RRC connection setup, e.g. mobility state and UE history. UE history is an extension of the eNB-based UE history, since it covers the visited cell list including both idle and active modes (plus the amount of time a UE is located within any given cell). However the existing reports and measurements are "historical" in nature, and, therefore, do not support reliable prediction of the future behaviour in the network, because they cannot be extrapolated to indicate the actual cause of the past behaviour in a reliable manner and hence how long the behaviour is likely to last. The non-cellular UE information included in the status reports described according to various aspects herein may provide the appropriate context in order to more reliably predict such future behaviour or to interpret the historical data in a better predictive manner.

The UE can determine the location/mobility non-cellular UE information based on feedback from various sensors including gyroscope, accelerometer, GPS, etc. For example, the UE may distinguish between whether it is in a vehicle (e.g., train, automobile, motorbike, etc.), stationary, or mobile pedestrian. The UE may also obtain or derive this information continuously and not just at handovers or reselections. In addition the UE may use additional application information, such as calendar information, time of day, to indicate to the network how long this mobility context is expected to continue.

In general, location and movement are typical inputs for many mobility-related network functions such as layer management, load management, tracking area management, handover preparation, etc. However, they can also be used to enable or disable localized services, such as local offload or proximity based services. Finally, the UE may also be able to optimize the user experience based on implementation. For example, it may be useful for the network to be aware at a periodic TAU that the UE has not only moved to another tracking area (TA) since the last update, but also the UE has not moved at all. As a result, the TA list area could be further narrowed to reduce network paging load.

In the RAN, the handling of a UE that moves from idle to active mode could also be optimized based on non-cellular UE information on mobility, thereby minimizing the number of handovers by staying on macrocells, or avoiding mobility-sensitive strategies such as local offload. Thus, without the additional context from the status reports configure according to the various aspects of the present disclosure, the RAN has to extrapolate from past behaviour, whereas mobile originated service requests are often made after a recent mobility behaviour change. For example, a user walks into a train and soon after begins a voice call (or triggers some information download); or a driver initiates a call or data interaction once the car arrives at destination or is stuck in traffic. In these and other cases, the UE could provide additional, more immediate information to the network that might override the current reports that might have more stale information.

Mobility patterns may also be exploited in status reports generated by UE configured according to aspects of the present disclosure to enhance future predictions by receiving compatible eNBs (e.g., through use of status reporting, as in the various described aspects, use of triggers, and the like). For example, the UE may be aware, through usage pattern, that the user is likely to leave work between 5:00 p.m. and 6:00 p.m., and, thus, may provide the network with an indication in a status report that the current mobility status is not expected to continue for long into the future during a TAU around 5:00 p.m. This could result in different layer management by eNBs configured according to aspects of the present disclosure or avoidance of local offload if the UE becomes active after this TAU. Another possibility, based on the reporting of the predicted usage pattern in the status reports configured according to various aspects of the present disclosure, the network may arrange for the early initiation of handover preparation or reservation of eNB resources through a particular route included in the status report based on the user's history.

In further example, if the UE's maps application is active, and the UE is 100 miles from the destination, then the UE can predict the mobility context based on the expected time to destination. The UE may include this non-cellular UE information in the status report that reflects a predicted change of mobility context. Similarly, if the calendar application indicates the UE is in an all-day meeting, and the UE is currently stationary, then the UE can indicate in such a status report the remaining time expected in the meeting.

Mobility or location information may also be used by minimum drive test (MDT) functions in order to select the better UEs for particular data collection functions. For example, the network may want to collect data in a certain specific area and is, therefore, more interested in static or low-mobility UEs. The collection of such network management information could be used, for example, to diagnose coverage or interference issues in a particular area.

For non-permanent spectrum (e.g., spectrum sharing such as licensed shared access (LSA)), spectrum could be reserved in advance, or the UE could communicate directly to other eNBs to give them advanced notice of potential communications. Spectrum may not always be available in LSA systems, but this implies also that an eNB may not necessarily use the LSA spectrum even when it is available, and could work off demand, or projected demand. Similar strategies could be used to reserve unlicensed spectrum if there was some form of coordination between multiple operator's use of this spectrum.

Another example of non-cellular UE information that may be used in a status report generated according to aspects of the present disclosure is UE's physical environment context. The "physical environment" of a UE includes any direct inputs from sensors in the UE apparatus, such as background noise (microphone) and its rate of change; light levels (night/day/indoors/outdoors) and its rate of change; position of phone (on table, in pocket, in hand); movement of phone (user is walking, running, etc.); movement of people/objects in vicinity of phone; proximity of user (e.g., is user known to be close such as by connection with other devices such as a paired watch, personal fitness device, etc.); or other user activity, such as whether the UE can detect that the user is a passenger in a vehicle rather than the driver (e.g., based on user movements, background noise, etc.). All the above information is, in principle, available in the UE and not currently available to the network. Such non-cellular UE information may be included in a status report configured according to various aspects herein and sent to the eNB for use in determining further network condition management.

The physical environment non-cellular UE information may be used as additional information in a status report configured according to various aspects of the present disclosure that are related to location and mobility. For example, if the UE is deemed to be stationary, light/background noise characteristics are static, and the user is not in proximity, then this combination of conditions included in a status report to a serving eNB increases the confidence by the eNB that the UE is in a "static" status. Conversely, a change in the environment (e.g., light changes, user approaches, etc.) may be a warning of impending location changes. The physical environment non-cellular UE information may be used in status reports configured according to various aspects to produce "matches" related to past behaviour. For example, it may be possible to define and recognize multiple environments within the same location and match the environment with user behaviour.

An additional use case for physical environment non-cellular UE information relates to the differentiation between "direct user interest" activities and others. For example, based on the environment sensing, the UE may know whether the user is, in fact, currently interested in the UE's activity in a real-time sense (e.g., user interest may be less likely when the UE is in a pocket, or the user is driving, or the user is not physically close to the UE). In such situations, inclusion of this type of physical environment non-cellular UE information into a status report may allow an eNB configured according to aspects of the present disclosure to consider the UE to be temporarily identified as a low-priority device, such as a temporary machine-type-communication (MTC)-like device and could, therefore, be considered to be available for selection by the base station to collect network management data, if it is unlikely to be required by the user. In additional non-network management functions, determination based on such non-cellular UE information in a status report that the UE is currently a low-priority device could trigger the network to use the low-priority UE for the purposes of handling network congestion for mobile originated calls.

In addition to the priority handling for the admission or congestion handling of a particular bearer (or the RRC connection) based on such non-cellular UE information included in a status report configured according to various aspects of the present disclosure, user-plane policies could also be applied in network condition management options to differentiate low "direct user interest" activities. For example, the bearer or bearers could be given lower priority in terms of scheduling or resource usage (reduced access to carrier aggregation, lower scheduling priority, no local offloading, no pre-emption of target resources in case of handover, etc.)

A further example of non-cellular UE information that may be included in a status report configured according to various aspects involves user context information. User context relates to what the user is currently doing. For example, user context could include sleeping, working, eating, driving, walking on the sidewalk, in a theater or watching TV, at a party, exercising, or the like. This type of information may be obtained or determined through analysis of several different types of data, which may be mined by the UE from multiple applications and sensors of the UE. For example, user calendar and events, location (as an adjunct e.g. is user at a restaurant, home), user heart rate, if available, determining whether the user is controlling other devices (e.g., TV, speaker, etc.) via other applications, or identifying specific active applications (e.g., driving information, pedometer, public transport timetable, etc.), specific user interaction with phone (e.g., use of camera, pressing buttons, voice recognition); standalone WiFi activity triggered by user actions (e.g., browsing maps), which is not known to network, and the like. Again, this information might be available in the UE (if it can be derived) and placed into a status report and is not currently available to the network.

The user context non-cellular UE information might be useful as additional information to help further classify user mobility or user activity events. For example, if the phone is static, and the user is known to be asleep, then the network may classify any mobile originated activity as low priority (because it is generated by processes in the phone itself and is not a real-time interaction). Another example network condition management operation might be to elevate the priority when information contained in a status report indicates that certain conditions are met (e.g., user is known to be under stress such as based on high heart rate under static conditions).

Such user context non-cellular UE information may be abstracted, for example, in terms of an index of or "likelihood of user interaction," meaning the likelihood of user-initiated phone interaction resulting in cellular network activity. This could take into account the information related to the user context as described above.

Another possible category of non-cellular UE information that may be included in a status report configured according to aspects of the present disclosure would be "user focus on phone." One value for this parameter could, for example, indicate that the user has been (or is) interacting with the device already, even though the device is in cellular idle mode. Such activity may not result in cellular activity if the user's actions do not require communication, or communication is being performed via WiFi, Bluetooth, or the like. This user context non-cellular UE information for a status report may also be useful in cases of idle-to-connected transition, e.g., if it can be determined that the activity is not directly triggered by the user and, therefore, has low priority. User context non-cellular UE information in a status report configured according to one aspect of the present disclosure could also signal an eNB analysing the status report whether the user is under stress (e.g., high heart rate, rate of typing errors, abnormal keystroke rate, and the like).

A further example of non-cellular UE information that may be incorporated in a status report configured according to aspects of the present disclosure is the time context. Time context non-cellular UE information may include specific time-related information such as time of day, day of the week, daylight information for a given location, calendar information, and the like. In addition, it should be possible to create an "observed" calendar by using past information (e.g., user context, location, etc.) and mapping this to a day or weekly calendar.

While the time, day, and date information is available to the network, the network does not have the link between time and user context, either from explicit calendar information, or from predictive calendar based on observed activities. The time context non-cellular UE information in a status report may provide an eNB with information regarding current and likely future activity of the user (as well as location). One use of such information by an eNB receiving a status report with such information may be the mobility use case (e.g., building a schedule of future user movements, or a customized neighbour cell list while idle, and pre-booking capacity while connected). The time context information may be further used to correlate and increase confidence in other indicators (e.g., the correlation between the current likely user status and a previous user status at the same time of day/week), and, thus, contribute to use cases supported by such indicators.

A further example of non-cellular UE information that may be included in a status report configured according to one aspect of the present disclosure is the device context information. Device context includes specific information, such as remaining power on the device, connectivity (including connectivity with WiFi, Bluetooth, etc.), screen activity (such as, recent direct user interaction), data status in phone (e.g., whether data is on/off), status of silent mode (on/off), and the like. In general, none of this device context information is known to the network, with the exception of UE activity that may trigger radio interactions (other than data actions when cellular data is not turned on).

Device context information included in such status reports may support various network operation management by an eNB. For example, remaining power on the UE could be used by the eNB to trigger a reduction of the maximum uplink power. Alternatively, remaining power could also be used by the eNB to increase the scheduling priority of the particular UE, in order to expedite the completion of the data session. Such management decisions by the eNB may also depend on whether the activity was user related or not. In idle mode, the remaining power on the phone could be used to increase the paging area, which may reduce the number of area updates that the mobile has to perform. Additionally, remaining power on the phone could be used to change the paging DRX cycle (e.g., longer DRX cycles as battery power goes below a predetermined threshold percentage). Remaining power on the phone could also be used to prioritize devices for local offloading actions (e.g., to small cells of WiFi), particularly if the device has significant uplink activity. This can also be used to bias the decision to take the device out of the offload access due to coverage aspects (e.g., if ultimately the device may end up using higher uplink power to reach the large cell, even if the downlink reception improves), or for priority of access to protected resources in the small cell (e.g., enhanced ICIC (eICIC)).

Screen activity can be used as an indicator of "direct user interest" in a status report configured according to various aspects of the present disclosure, and generally prompt an eNB to trigger higher priority handling for any bearers activated as a result. WiFi connectivity and data status can also be used in a status report to provide a strong indicator of whether the UE is likely to initiate any data transactions (e.g. highly unlikely if there is standalone WiFi connectivity and data is off). For example, if the UE signals in a status report that it is changing to "no WiFi connectivity" and "data on" via user interaction with the phone, then there is a very high probability that the user is about to initiate a data session. If, instead, the phone changes only to "data on" first and then much later to "no WiFi connectivity," it is much less likely that data activity will be user initiated when it starts later. An eNB with such information in a status report from the UE may select the appropriate network condition management operations.

It should be noted that various additional examples of non-cellular UE information that may be included in a status report configured according to various aspects of the present disclosure may also be applicable under the different aspects of the present disclosure. The specific examples described herein are meant only to provide an example of such different non-cellular UE information types that may be included in such status reports and their potential uses by a receiving eNB for network condition management.

Figure 4:
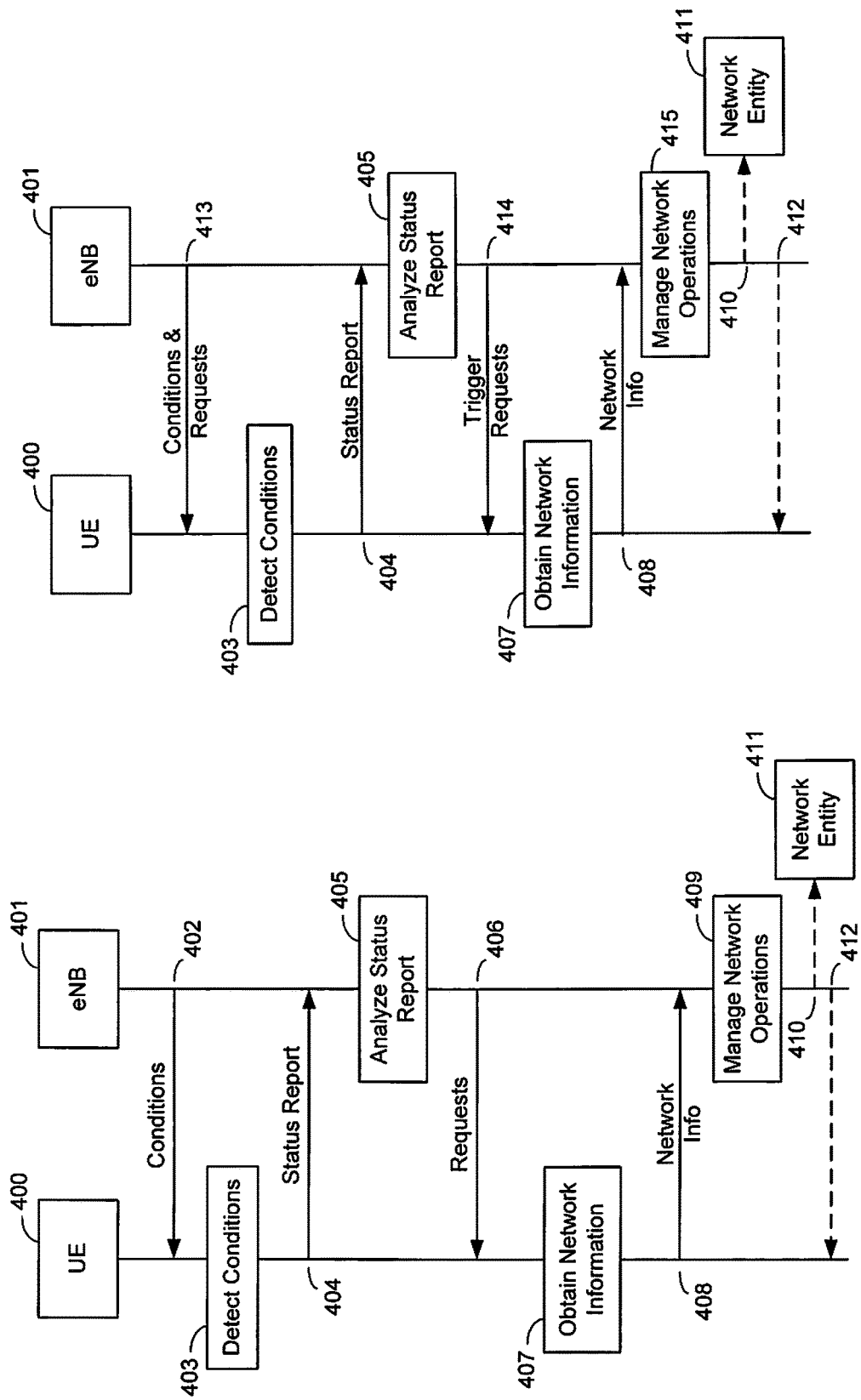
FIGS. 4A and 4B are call flow diagrams illustrating communications between a UE and a serving base station each configured according to an aspect of the present disclosure.

FIG. 4A is a call flow diagram illustrating example communications between a UE 400 and eNB 401 configured according to one aspect of the present disclosure. The interaction between UE 400 and eNB 401 illustrated in FIG. 4A is also described with respect to FIGS. 6A and 6B to illustrate operations of UE 400 and eNB 401. As illustrated in FIGS. 6A and 6B, UE 400 and eNB 401 are composed of various hardware, components, and executable logic, which, when executed by a processor, such as controller/processor 280 of UE 400 and controller/processor 240 of eNB 401, generates the operation environments that provide the features, functionalities, and operations of UE 400 and eNB 401, respectively. UE 400 includes many of the components and hardware illustrated for UE 120 (FIG. 2). For example, UE 400 includes controller/processor 280, memory 282, antennas 252a-r, and wireless radios 600a-r. Wireless radios 600a-r may include a number of different components, such as demodulator/modulators 254a-r, MIMO detector 256, receive processor 258, transmit processor 264, and TX MIMO processor 266. UE 400 also includes sensors 601a-n, which provide a variety of sensors for measuring various non-cellular UE information. Sensors 601a-n may include sensors, such as gyroscopes, accelerometers, GPS, thermometer, barometer, light sensors, microphones, and the like. eNB 401 also includes many of the components and hardware illustrated for eNB 110 (FIG. 2). For example, eNB 401 includes controller/processor 240, memory 242, antennas 234a-t, and wireless radios 609a-t. Wireless radios 609a-t may include such individual components as modulator/demodulators 232a-t, MIMO detector 236, receive processor 238, transmit processor 220, and TX MIMO processor 230.

At time 402, eNB 401 transmits a set of conditions 610 for triggering a status report from UE 400. The set of conditions 610 is transmitted via wireless radios 609a-t and antennas 234a-t to UE 400. The set of conditions 602, stored in memory 282 at UE 400 includes at least one condition that may be determined based on detection of non-cellular UE information. The transmission from eNB 401 may also include a status report configuration 611, stored in memory 242, that details the format of and information to be included in the status report, which includes either one or both of non-cellular and cellular UE information. In alternative aspects, the status report configuration 611 may be standardized and known to each network entity. In still other aspects, the status report configuration 611 may be semi-statically set by the network through the serving base station, such as eNB 401.

Once received by UE 400 via antennas 252a-r, and wireless radios 600a-r, UE 400, under control of controller/processor 280, will monitor for the identified set of trigger conditions. UE 400 stores the set of conditions 602 and status report configuration 603 in memory 282 and, using sensors 601a-n under control of controller/processor 280, conditions for non-cellular UE information may be monitored in additional to other cellular UE information that may be sensed through operation of wireless radios 600a-r and measurement logic 605 by controller/processor 280. At time 403, the UE 400 detects the triggering conditions and, controller/processor 280 executes status report generator 604, stored in memory 282 to generate a status report according to the status report configuration 603. UE 400 transmits the status report at time 404 via wireless radios 600a-r and antennas 252a-r, under control of controller/processor 280. eNB 401 receives the status report 612, stores it in memory 242, and analyzes all of the UE information, including one or both of the non-cellular and cellular UE information, at time 405, through execution of network condition management 613 by controller/processor 240. Based on the analysis, eNB 401 determines whether or not to select UE 400 for further network management tasks. If eNB 401 determines to select UE 400 for further network management tasks, eNB 401 transmit one or more requests for network information 614, at time 406, to UE 400 using wireless radios 609a-t and antennas 234a-t. At time 407, UE 400 obtains the network information through measurement logic 605 executed by controller/processor 280 for monitoring such network information via antennas 252a-r and wireless radios 600a-r. UE 400 then transmits the network information back to eNB 401 at time 408. Based on the network information received from UE 400, eNB 401 manages network operations at time 409 through execution of network condition management 613. Management of network operations through execution of network condition management 613 may include any variety of operations under control of controller/processor 240 that modifies the network operations and communications with UE 400, or additionally that modify network operations and communications with other UEs (not shown). For example, at time 410, eNB 401 may signal network entity 411 to modify operations. Network entity 411 may be a neighboring access point or base station and the modification of operations requested by eNB 401 may include various actions, such as reserving resources for predicted future communications from UE 400, modifying transmissions on certain channels or frequencies to reduce potential interference, and the like. Additionally or alternatively, at time 412, eNB 401 may manage network operations by signaling new configuration information to UE 400. For example, eNB 401 may send new configuration information that modifies the neighbor cell list 606, stored in memory 282 of UE 400, updates mobility parameters 607, and the like. Such network operations management decisions are made by eNB 401 based on the current or predicted operations of UE based on at least the non-cellular UE information received in the status report 612 that may further prompt gathering of the network information.

FIG. 4B is a call flow diagram illustrating example communications between UE 400 and eNB 401 configured according to one aspect of the present disclosure. As indicated above, the requests for network information may be included in the transmission of the set of conditions 610 and status report configuration 611 from eNB 401 to UE 400. Thus, in the alternative aspect illustrated in FIG. 4B, at time 413, eNB 401 transmits not only the set of conditions 610 and status report configuration 611 including at least one non-cellular condition for triggering a status report from UE 400, but also transmits the requests for network information 614 that may be used in execution of network condition management 613 by controller/processor 240. UE 400 stores set of conditions 602, status report configuration 603, and requests for network information 604 in memory 282 and, under control of controller/processor 280, will begin monitoring for the triggering conditions using sensors 601a-n. As in the example aspect described with respect to FIG. 4A, UE 400 detects the triggering condition and executes status report generator 604 in order to generate the status report according to the status report configuration 603, which includes one or both of the non-cellular and cellular UE information. UE 400 transmits the status report at time 404 via wireless radios 600a-r and antennas 252a-r. At time 405, eNB 401 receives status report 612 and, on execution of network condition management 613 by controller/processor 240, analyzes the status report 612 with either or both of the non-cellular and cellular UE information and, based on this status report 612 may determine whether or not to select UE 400 for network management tasks. If eNB 401 determines to select UE 400 to perform additional network management tasks, eNB 401 will transmit a triggering signal, at time 414, which triggers UE 400 to perform one or more of the requests for network information 605 received at time 413. The number of tasks to fulfill the requests for network information 605 may vary depending on the information analyzed in the status report 612 from UE 400. Thus, the triggering signal may trigger UE 400 to execute one or more of the requests for network information 605 that it received at time 413. UE 400 will then transmit to eNB 401 via wireless radios 600a-r and antennas 252a-r the network information obtained based on the triggered requests at time 408. As illustrated and described with respect to FIG. 4A, depending on the operations of the network that eNB 401 determines to manage, it may either or both of transmit instructions or configuration information to network entity 411 at time 410 or to UE 400 at time 412. Such management may include reserving resources at other access points or base stations based on predicted future communications or updating configuration data at UE 400, as described in detail with respect to FIG. 4A.

Figure 5:
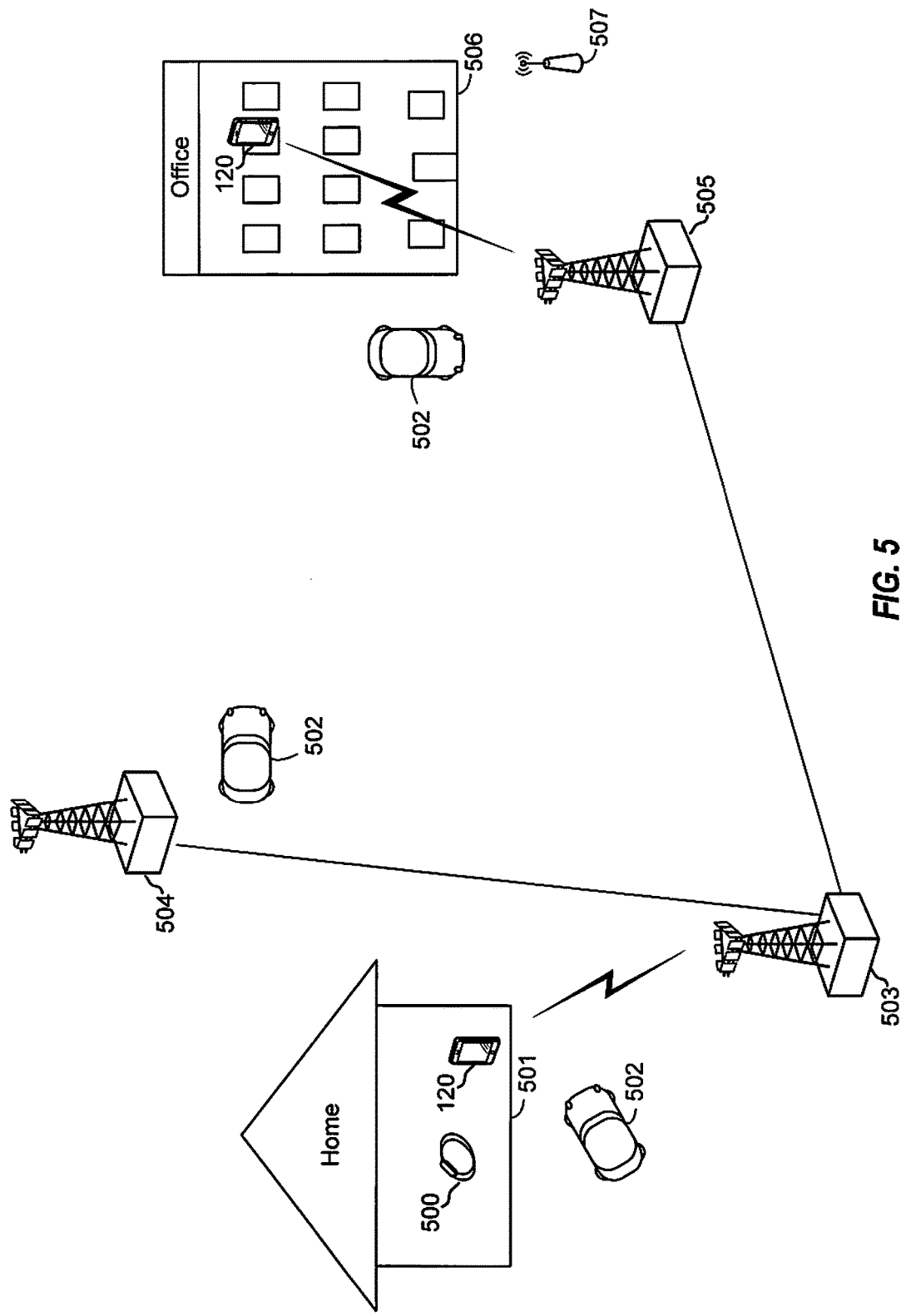
FIG. 5 is a block diagram illustrating a UE and eNBs configured according to one aspect of the present disclosure.

FIG. 5 is a block diagram illustrating a UE 120 and eNBs 503-505 configured according to one aspect of the present disclosure. UE 120 is located initially at a home 501 of the user. UE 120 is camped on eNB 503 and receives a set of conditions from eNB 503 for triggering a status report of various non-cellular and cellular UE information. In one non-limiting example, a triggering condition included in the set of conditions provides for a status report to be sent when the user is in proximity to UE 120 and the UE 120 is traveling in a vehicle, such as automobile 502. The user owns and wears a personal fitness device (PFD) 500 that is linked to various applications available to run on UE 120. As the user, while wearing PFD 500 comes into proximity of UE 120 and proceeds to enter vehicle 502 to drive from home 501 to office 506. Non-cellular applications running on UE 120 have monitored the user's activities and expects on particular sets of days that the user will take UE 120 into office 506. As the user begins the journey to office 506, sensors in UE 120 detect motion at a velocity in excess of human-powered movement and determine that UE 120 is in a vehicle. With both triggering conditions having been met, UE 120 generates a status report for transmission to eNB 503. UE 120 gathers non-cellular UE information such as that UE 120 is in a vehicle, the predicted route to office 506, battery life, specific data-communicating applications running on UE 120, and cellular information, such as the signal strength of neighboring base stations, and the like. This cellular and non-cellular UE information is packaged into the status report and transmitted to eNB 503.

In analyzing the information in the status report, eNB 503 determines to reserve resources at multiple eNBs, eNBs 504 and 505, along the predicted route of automobile 502. Therefore, eNB 503 transmits instructions to eNBs 504 and 505 to reserve resources for UE 120 for an estimated future time when UE 120 is predicted to enter the coverage areas of eNBs 504 and 505. eNB 503 also transmits mobility information to UE 120 that facilitates efficient connection establishment with both of eNBs 504 and 505.

As the user reaches the destination of office 506 and exits automobile 502, UE 120 monitors the set of conditions for any additional triggering conditions. The user enters office 506 and places UE 120 into a desk. The user walks away from UE 120. As PFD 500 exits proximity to UE 120, UE 120 detects another trigger to send a status report, this time, to eNB 505. Similar cellular and non-cellular UE information are transmitted in the status report to eNB 505. eNB 505 analyzes the status information and based on this context of UE 120 determines to select UE 120 for additional network management tasks. eNB 505 sends a request for UE 120 to search available access points in its location. UE 120 performs a search and discovers small cell access point 507, which is not currently included in the neighbor cell list of UE 120. UE 120 sends the identity information, signal measurement information, and the like to eNB 505. eNB 505 then transmits a control signal to UE 120 to update its neighbor cell list to include small cell access point 507. eNB 505 adds small cell access point to its own neighbor cell list, which allows eNB 505 not only to offload traffic associated with UE 120 to small cell access point 507, but also offload any additional UEs in office 506 that is serves to small cell access point 507.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 3A and 3B may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C), and any combinations thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
    transmitting, by a base station to a user equipment (UE) served by the base station, a set of conditions that trigger the UE to transmit a status report to the base station, wherein the status report includes information received by the UE from another electronic device associated with a user of the UE, and wherein the set of conditions includes at least one non-cellular UE condition;

receiving, by the base station, the status report from the UE, wherein the status report includes non-cellular UE information, and wherein the non-cellular UE information includes one or more of:

alerting mode of UE;

location of UE;

predicted location of UE based on UE calendar information;

predicted level of user interaction with UE based on status information locally accessible by the UE; and proximity to a human identified as the user of the UE; and determining, by the base station, whether to select the UE for one or more network management tasks for network condition management based on the status report.

2. The method of claim 1, wherein the status report further includes one or more of:

calendar information of the UE;

alarm information of the UE; and application data from an application running on the UE.

3. The method of claim 2, wherein the status information includes calendar information of the UE.

4. The method of claim 2, wherein the status information includes alarm information of the UE.

5. The method of claim 2, wherein the status information includes application data from an application running on the UE.

6. The method of claim 1, further including:

transmitting, by the base station, one or more requests for network management information to the UE, wherein the transmitting of the one or more requests is performed:

in response to a determination to select the UE for the one or more network tasks; or along with the transmitting the set of conditions; and performing, by the base station, network condition management based, at least in part, on network management information received from the UE in response to the one or more requests.

7. The method of claim 6, wherein the one or more requests include requests for one or more of:

radio conditions experienced by the UE;

power measurements of signals received at the UE from one or more neighboring base stations;

decoded signals intercepted by the UE from one or more proximate access points, wherein the one or more proximate access points are not in a current neighbor cell list;

interference conditions from one or more network entities; and channel conditions in one or more of: one or more different frequencies, one or more different bands, or one or more different radio access technologies.

8. The method of claim 6, wherein the one or more requests are transmitted along with the set of conditions, the method further including:

transmitting, by the base station, a trigger signal to the UE based on the status report, wherein the trigger signal signals the UE to respond to the one or more requests; and performing, by the base station, network condition management based, at least in part, on network management information received from the UE in response to the one or more requests.

9. The method of claim 6, further including:

managing, by the base station, communications of the UE on a network of the base station based on one or more of: the status report and the network management information, wherein the managing communications of the UE includes one or more of:

estimating predicted radio capacity for future UE communications;

reserving resources in one or more base stations for the future UE communications;

modifying a neighbor cell list of the UE; and updating mobility parameters for the UE.

10. The method of claim 1, further including:

performing, by the base station, network condition management based on the status report.

11. The method of claim 1, wherein the network condition management includes one or more of:

change to a list of available neighbor cells;

modification of transmission characteristics of one or more neighboring cells;

split of one or more neighboring cells into multiple cells;

combination of one or more neighboring cells into one or more combined cells;

modification of parameters for one of: handover or cell reselection;

change of an activation status of one or more neighboring cells based, at least in part, on one or more of: location and predicted activity of the one or more neighboring cells;

management of load conditions in one or more neighboring cells; and change of an enablement status of direct communication between one or more network entities using resources shared with network transmissions associated with the base station.

12. The method of claim 1, further including:

transmitting, by the base station, a status report configuration, wherein the status report configuration identifies one or more specific types of information to be included in the status report.

13. The method of claim 1, wherein the set of conditions further includes one or more cellular UE conditions.

14. The method of claim 1, wherein the non-cellular UE information includes alerting mode of UE.

15. The method of claim 1, wherein the non-cellular UE information includes location of UE.

16. The method of claim 1, wherein the non-cellular UE information includes predicted location of UE based on UE calendar information.

17. The method of claim 1, wherein the non-cellular UE information includes predicted level of user interaction with UE based on status information locally accessible by the UE.

18. The method of claim 1, wherein the non-cellular UE information includes proximity to human identified as the user of UE.

19. A method of wireless communication, comprising:

receiving, at a user equipment (UE) from a serving base station, a set of conditions that trigger the UE to transmit a status report to the serving base station, wherein the set of conditions includes at least one non-cellular UE condition, and wherein the at least one non-cellular UE condition includes one or more of:

alerting mode of UE;

location of UE;

predicted location of UE based on UE calendar information;

predicted level of user interaction with UE based on status information locally accessible by the UE; and
proximity to a human identified as a user of the UE;
detecting, by the UE, one or more of the set of conditions;
obtaining, by the UE, reporting information for the status report, wherein the reporting information includes non-cellular UE information received by the UE from another electronic device associated with the user of the UE;
transmitting, by the UE, the status report to the serving base station;
receiving, at the UE, one or more information requests from the serving base station for network management information; and
transmitting, by the UE, a measurement report including the network management information obtained in response to the one or more information requests.

20. The method of claim 19, wherein the reporting information further includes one or more of:
calendar information of the UE;
alarm information of the UE; and
application data from an application running on the UE.

21. The method of claim 19, wherein the reporting information is obtained according to a status report configuration identifying one or more specific types of information to be included in the status report.

22. The method of claim 19, wherein the set of conditions further includes one or more cellular UE conditions.

23. The method of claim 19, wherein the one or more requests include requests for one or more of:
measuring, by the UE, radio conditions experienced by the UE;
identifying and measuring, by the UE, power received from one or more neighboring base stations;
decoding, by the UE, signals intercepted from one or more proximate access points, wherein the one or more proximate access points are not in a current neighbor cell list;
determining, by the UE, interference conditions from one or more network entities; and
measuring, by the UE, channel conditions in one or more of: one or more different frequencies, one or more different bands, or one or more different radio access technologies.

24. The method of claim 19, further including:
receiving, by the UE, UE configuration information from the serving base station, wherein the UE configuration information is based, at least in part, on the network management information included in the measurement report.

25. The method of claim 24, wherein the UE configuration information includes one or more of:
an updated neighbor cell list;
updated mobility parameters.

26. An apparatus configured for wireless communication, comprising:
means for transmitting, by a base station to a user equipment (UE) served by the base station, a set of conditions that trigger the UE to transmit a status report to the base station, wherein the status report includes information received by the UE from another electronic device associated with a user of the UE, and wherein the set of conditions includes at least one non-cellular UE condition;
means for receiving, by the base station, the status report from the UE, wherein the status report includes non-cellular UE information, and wherein the non-cellular UE information includes one or more of:
alerting mode of UE;
location of UE;
predicted location of UE based on UE calendar information;
predicted level of user interaction with UE based on status information locally accessible by the UE; and
proximity to a human identified as the user of the UE; and
means for determining, by the base station, whether to select the UE for one or more network management tasks for network condition management based on the status report.

27. The apparatus of claim 26, wherein the status report further includes one or more of:
calendar information of the UE;
alarm information of the UE; and
application data from an application running on the UE.

28. The apparatus of claim 26, further including:
means for transmitting, by the base station, one or more requests for network management information to the UE, wherein the means for transmitting of the one or more requests is executed one of:
in response to a determination to select the UE for the one or more network tasks; and
along with the transmitting the set of conditions; and
means for performing, by the base station, network condition management based, at least in part, on network management information received from the UE in response to the one or more requests.

29. The apparatus of claim 28, wherein the one or more requests include requests for one or more of:
radio conditions experienced by the UE;
power measurements received at the UE from one or more neighboring base stations;
decoded signals intercepted by the UE from one or more proximate access points, wherein the one or more proximate access points are not in a current neighbor cell list;
interference conditions from one or more network entities; and
channel conditions in one or more of: one or more different frequencies, one or more different bands, or one or more different radio access technologies.

30. The apparatus of claim 28, wherein the one or more requests are transmitted along with the set of conditions, the apparatus further including:
means for transmitting, by the base station, a trigger signal to the UE based on the status report, wherein the trigger signal signals the UE to respond to the one or more requests; and
means for performing, by the base station, network condition management based, at least in part, on network management information received from the UE in response to the one or more requests.

31. The apparatus of claim 28, further including:
means for managing, by the base station, communications of the UE on a network of the base station based on one or more of: the status report and the network management information, wherein the means for managing communications of the UE includes one or more of:
means for estimating predicted radio capacity for future UE communications;
means for reserving resources in one or more base stations for the future UE communications;
means for modifying a neighbor cell list of the UE; or means for updating mobility parameters for the UE.

32. The apparatus of claim 26, further including:
means for performing, by the base station, network condition management based on the status report.

33. The apparatus of claim 26, wherein the network condition management includes one or more of:
change to a list of available neighbor cells;
modification of transmission characteristics of one or more neighboring cells;
split of one or more neighboring cells into multiple cells;
combination of one or more neighboring cells into one or more combined cells;
modification of parameters for one of: handover or cell reselection;
change of an activation status of one or more neighboring cells based, at least in part, on one or more of: location and predicted activity of the one or more neighboring cells;
management of load conditions in one or more neighboring cells; and
change of an enablement status of direct communication between one or more network entities using resources shared with network transmissions associated with the base station.

34. The apparatus of claim 26, further including:
means for transmitting, by the base station, a status report configuration, wherein the status report configuration identifies one or more specific types of information to be included in the status report.

35. The apparatus of claim 26, wherein the set of conditions further includes one or more cellular UE conditions.

36. An apparatus configured for wireless communication, comprising:
means for receiving, at a user equipment (UE) from a serving base station, a set of conditions that trigger the UE to transmit a status report to the serving base station, wherein the set of conditions includes at least one non-cellular UE condition, and wherein the at least one non-cellular UE condition includes one or more of:
alerting mode of UE;
location of UE;
predicted location of UE based on UE calendar information;
predicted level of user interaction with UE based on status information locally accessible by the UE; and
proximity to a human identified as a user of the UE;
means for detecting, by the UE, one or more of the set of conditions;
means for obtaining, by the UE, reporting information for the status report, wherein the reporting information includes non-cellular UE information received by the UE from another electronic device associated with the user of the UE;
means for transmitting, by the UE, the status report to the serving base station; and
means for receiving, at the UE, one or more information requests from the serving base station for network management information; and
means for transmitting, by the UE, a measurement report including the network management information obtained in response to the one or more information requests.

37. The apparatus of claim 36, wherein the reporting information further includes one or more of:
calendar information of the UE;
alarm information of the UE; and
application data from an application running on the UE.

38. The apparatus of claim 36, wherein the one or more requests include requests for one or more of:
means for measuring, by the UE, radio conditions experienced by the UE;
means for identifying and measuring, by the UE, power of signals received from one or more neighboring base stations;
means for decoding, by the UE, signals intercepted from one or more proximate access points, wherein the one or more proximate access points are not in a current neighbor cell list;
means for determining, by the UE, interference conditions from one or more network entities; and
means for measuring, by the UE, channel conditions in one or more of: one or more different frequencies, one or more different bands, or one or more different radio access technologies.

39. The apparatus of claim 36, wherein the reporting information is obtained according to a status report configuration identifying one or more specific types of information to be included in the status report.

40. The apparatus of claim 36, wherein the set of conditions further includes one or more cellular UE conditions.

41. The apparatus of claim 36, further including:
means for receiving, by the UE, UE configuration information from the serving base station, wherein the UE configuration information is based, at least in part, on the network management information included in the measurement report.

42. The apparatus of claim 41, wherein the UE configuration information includes one or more of:
an updated neighbor cell list;
updated mobility parameters.

43. A non-transitory computer-readable medium having program code recorded thereon, comprising:
program code for causing a computer to transmit, by base station to a user equipment (UE) served by the base station, a set of conditions that trigger the UE to transmit a status report to the base station, wherein the status report includes information received by the UE from another electronic device associated with a user of the UE, and wherein the set of conditions includes at least one non-cellular UE condition;
program code for causing the computer to receive, by the base station, the status report from the UE, wherein the status report includes non-cellular UE information, and wherein the non-cellular UE information includes one or more of:
alerting mode of UE;
location of UE;
predicted location of UE based on UE calendar information;
predicted level of user interaction with UE based on status information locally accessible by the UE; and
proximity to a human identified as the user of the UE; and
program code for causing the computer to determine, by the base station, whether to select the UE for one or more network management tasks for network condition management based on the status report.

44. The non-transitory computer-readable medium of claim 43, wherein the status report further includes one or more of:
calendar information of the UE;
alarm information of the UE; and
application data from an application running on the UE.

45. The non-transitory computer-readable medium of claim 43, further including:
program code for causing the computer to transmit, by the base station, one or more requests for network management information to the UE, wherein the program code for causing the computer to transmit of the one or more requests is executed one of:
in response to a determination to select the UE for the one or more network tasks; and
along with the transmitting the set of conditions; and
program code for causing the computer to perform, by the base station, network condition management based, at least in part, on network management information received from the UE in response to the one or more requests.

46. The non-transitory computer-readable medium of claim 45, wherein the one or more requests include requests for one or more of:
radio conditions experienced by the UE;
power measurements received at the UE from one or more neighboring base stations;
decoded signals intercepted by the UE from one or more proximate access points, wherein the one or more proximate access points are not in a current neighbor cell list;
interference conditions from one or more network entities; and
channel conditions in one or more of: one or more different frequencies, one or more different bands, or one or more different radio access technologies.

47. The non-transitory computer-readable medium of claim 43, wherein the network condition management includes one or more of:
change to a list of available neighbor cells;
modification of transmission characteristics of one or more neighboring cells;
split of one or more neighboring cells into multiple cells;
combination of one or more neighboring cells into one or more combined cells;
modification of parameters for one of: handover or cell reselection;
change of an activation status of one or more neighboring cells based, at least in part, on one or more of: location and predicted activity of the one or more neighboring cells;
management of load conditions in one or more neighboring cells; and
change of an enablement status of direct communication between one or more network entities using resources shared with network transmissions associated with the base station.

48. A non-transitory computer-readable medium having program code recorded thereon, comprising:
program code for causing a computer to receive, at a user equipment (UE) from a serving base station, a set of conditions that trigger the UE to transmit a status report to the serving base station, wherein the set of conditions includes at least one non-cellular UE condition, and wherein the at least one non-cellular UE condition includes one or more of:
alerting mode of UE;
location of UE;
predicted location of UE based on UE calendar information;
predicted level of user interaction with UE based on status information locally accessible by the UE; and
proximity to a human identified as a user of the UE;
program code for causing the computer to detect, by the UE, one or more of the set of conditions;
program code for causing the computer to obtain, by the UE, reporting information for the status report, wherein the reporting information includes non-cellular UE information received by the UE from another electronic device associated with the user of the UE, and;
program code for causing the computer to transmit, by the UE, the status report to the serving base station;
program code for causing the computer to receive, at the UE, one or more information requests from the serving base station for network management information; and
program code for causing the computer to transmit, by the UE, a measurement report including the network management information obtained in response to the one or more information requests.

49. The non-transitory computer-readable medium of claim 48, wherein the reporting information further includes one or more of:
calendar information of the UE;
alarm information of the UE; and
application data from an application running on the UE.

50. The non-transitory computer-readable medium of claim 48, wherein the one or more information requests include requests for one or more of:
program code for causing the computer to measure, by the UE, radio conditions experienced by the UE;
program code for causing the computer to identify and measure, by the UE, power received from one or more neighboring base stations;
program code for causing the computer to decode, by the UE, signals intercepted from one or more proximate access points, wherein the one or more proximate access points are not in a current neighbor cell list;
program code for causing the computer to determine, by the UE, interference conditions from one or more network entities; and
program code for causing the computer to measure, by the UE, channel conditions in one or more of: one or more different frequencies, one or more different bands, or one or more different radio access technologies.

51. An apparatus configured for wireless communication, the apparatus comprising:
at least one processor; and
a memory coupled to the at least one processor,
wherein the at least one processor is configured:
to transmit, by a base station to a user equipment (UE) served by the base station, a set of conditions that trigger the UE to transmit a status report to the base station, wherein the status report includes information received by the UE from another electronic device associated with a user of the UE, and wherein the set of conditions includes at least one non-cellular UE condition;
to receive, by the base station, the status report from the UE, wherein the status report includes non-cellular UE information, wherein the non-cellular UE information includes one or more of:
alerting mode of UE;
location of UE;
predicted location of UE based on UE calendar information;
predicted level of user interaction with UE based on status information locally accessible by the UE; and
proximity to a human identified as the user of the UE; and to determine, by the base station, whether to select the UE for one or more network management tasks for network condition management based on the status report.

52. The apparatus of claim 51, wherein the status report further includes one or more of:
   calendar information of the UE;
   alarm information of the UE; and
   application data from an application running on the UE.

53. The apparatus of claim 51, further including configuration of the at least one processor:
   to transmit, by the base station, one or more requests for network management information to the UE, wherein the configuration of the at least one processor to transmit the one or more requests is executed:
      in response to a determination to select the UE for the one or more network tasks; or
      along with the transmitting the set of conditions; and
   to perform, by the base station, network condition management based, at least in part, on network management information received from the UE in response to the one or more requests.

54. The apparatus of claim 51, wherein the network condition management includes one or more of:
   change to a list of available neighbor cells;
   modification of transmission characteristics of one or more neighboring cells;
   split of one or more neighboring cells into multiple cells;
   combination of one or more neighboring cells into one or more combined cells;
   modification of parameters for one of: handover or cell reselection;
   change of an activation status of one or more neighboring cells based, at least in part, on one or more of: location and predicted activity of the one or more neighboring cells;
   management of load conditions in one or more neighboring cells; and
   change of an enablement status of direct communication between one or more network entities using resources shared with network transmissions associated with the base station.

55. An apparatus configured for wireless communication, the apparatus comprising:
   at least one processor; and
   a memory coupled to the at least one processor,
   wherein the at least one processor is configured:
      to receive, at a user equipment (UE) from a serving base station, a set of conditions that trigger the UE to transmit a status report to the serving base station, wherein the set of conditions includes at least one non-cellular UE condition, wherein the at least one non-cellular UE condition includes one or more of:
         alerting mode of UE;
         location of UE;
         predicted location of UE based on UE calendar information;
         predicted level of user interaction with UE based on status information locally accessible by the UE; and
         proximity to a human identified as a user of the UE;
      to detect, by the UE, one or more of the set of conditions;
      to obtain, by the UE, reporting information for the status report, wherein the reporting information includes non-cellular UE information received by the UE from another electronic device associated with the user of the UE, and;
      to transmit, by the UE, the status report to the serving base station;
      to receive, at the UE, one or more information requests from the serving base station for network management information; and
      to transmit, by the UE, a measurement report including the network management information obtained in response to the one or more information requests.

56. The apparatus of claim 55, wherein the reporting information further includes one or more of:
   calendar information of the UE;
   alarm information of the UE; and
   application data from an application running on the UE.

57. The apparatus of claim 55, wherein the one or more information requests include requests for one or more of:
   measure, by the UE, radio conditions experienced by the UE;
   identify and measure, by the UE, power received from one or more neighboring base stations;
   decode, by the UE, signals intercepted from one or more proximate access points, wherein the one or more proximate access points are not in a current neighbor cell list;
   determine, by the UE, interference conditions from one or more network entities; and
   measure, by the UE, channel conditions in one or more of: one or more different frequencies, one or more different bands, or one or more different radio access technologies.

* * * * *